Patented Jan. 17, 1950

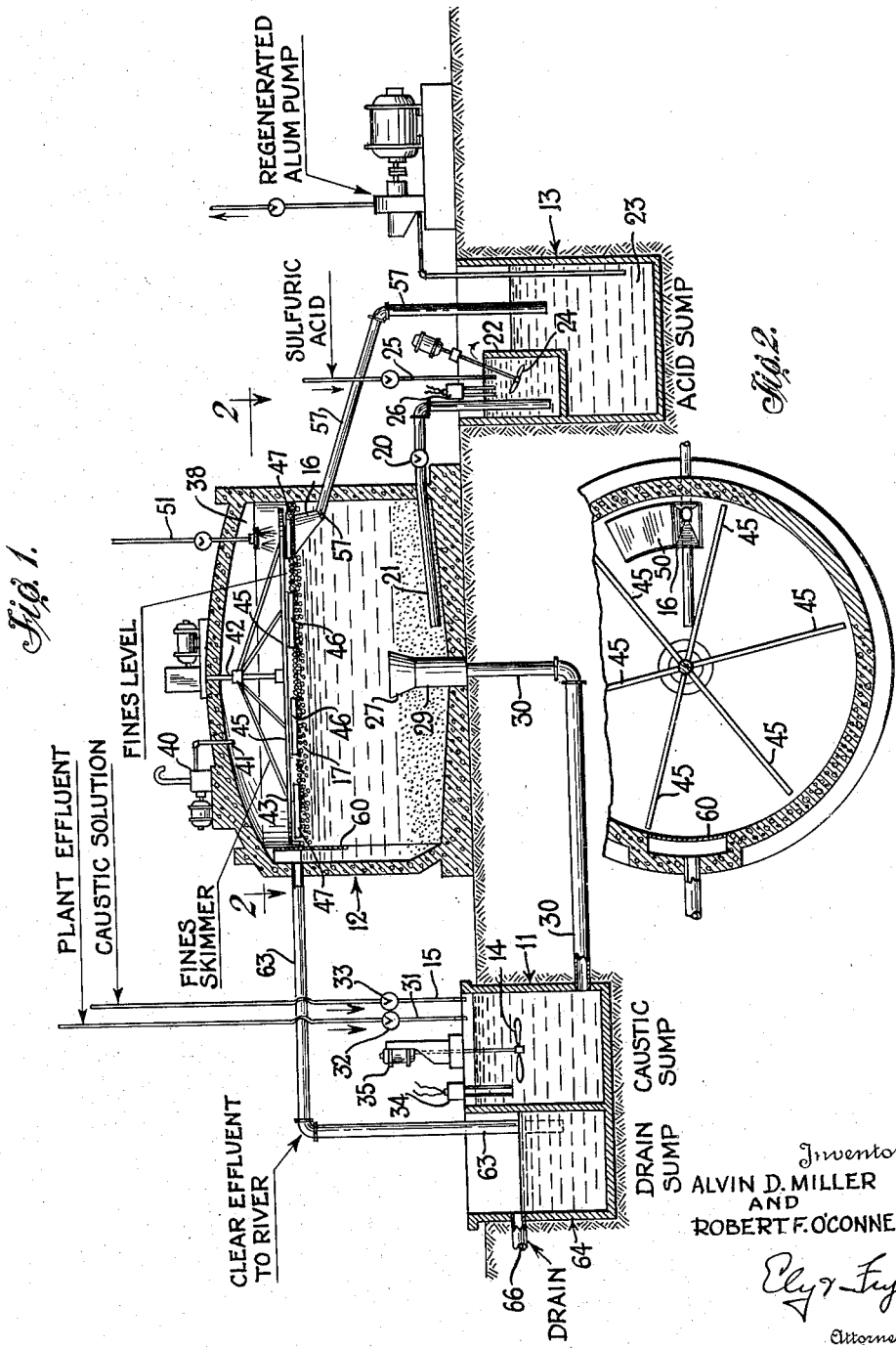

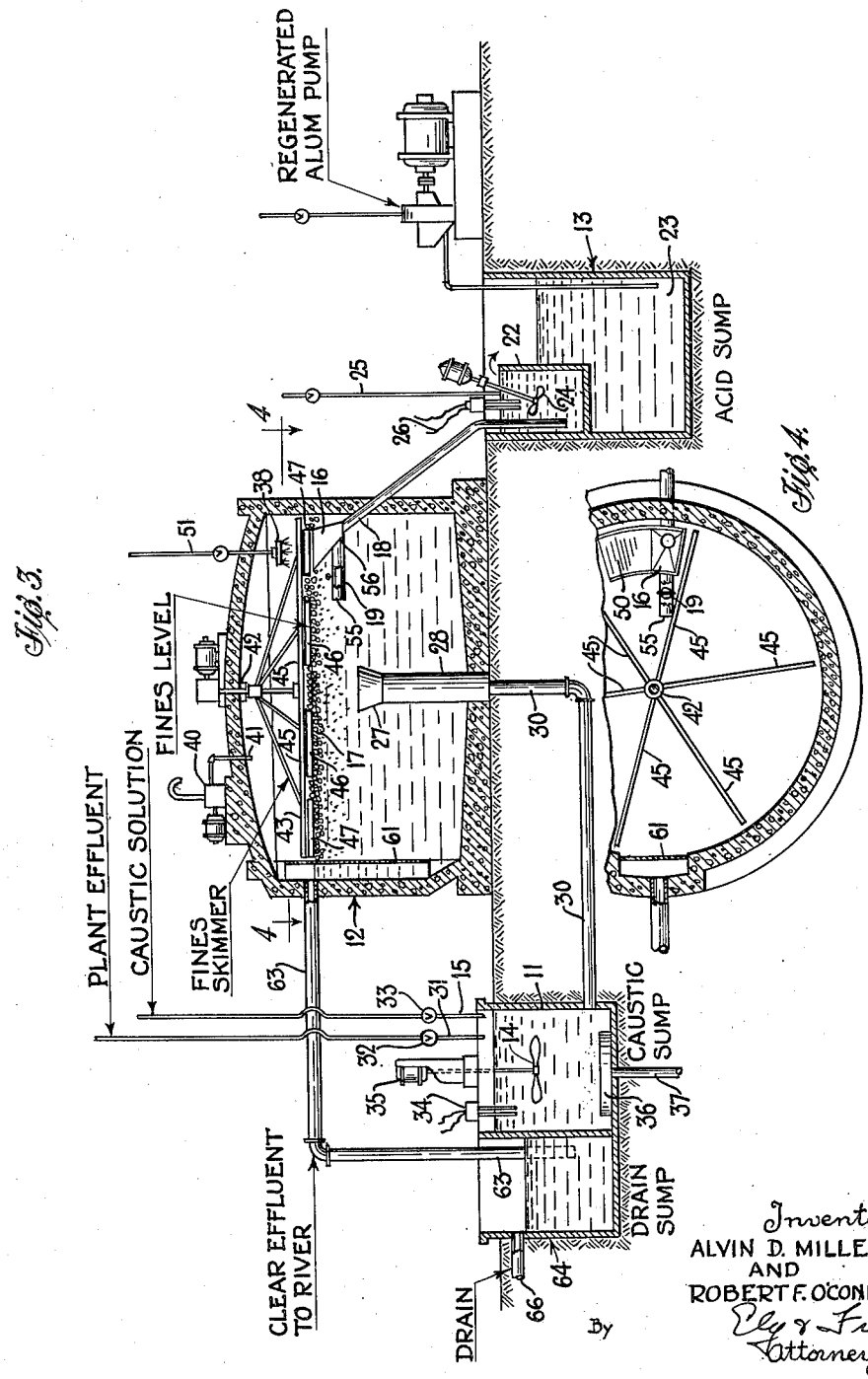

2,495,120

UNITED STATES PATENT OFFICE 2,495,120

METHOD OF TREATING SYNTHETIC RUBBER COAGULANT EFFLUENT TO RECOVER ALUMINUM SALTS

Alvin D. Miller, Cuyahoga Falls, Ohio, and Robert F. O'Connell, St. Louis, Mo., assignors to The Firestone Tire & Rubber Company, Akron, Ohio, a corporation of Ohio Application December 13, 1944, Serial No. 567,942

3 Claims. (Cl. 23—123)

This invention relates to the recovery of aluminum salts in waste plant effluents or spent process liquors.

In the manufacture of synthetic rubbers such as Buna S, Buna N, polybutadiene, and the like, aluminum salts are extensively used to coagulate aqueous dispersions of these elastomers in order to prepare the coagula in commercial form. Ordinarily 2 to 4% solutions of aluminum sulfate are used to precipitate the synthetic rubber from these dispersions. There is very little chemical conversion entailed in the coagulating process and very little of the aluminum salt is removed from the coagulating solution when the synthetic rubber coagulum is mechanically separated therefrom. The aluminum sulfate solution is diluted, however, by the water contained in the synthetic rubber dispersion. In the usual synthetic rubber manufacturing practice and with latices of 25 to 35% synthetic rubber, this method of coagulation results in the discharge of the used coagulating solution the concentration of which is approximately 50% of the unused solution. This is well below the concentration of an efficient coagulating medium. It is the usual practice to retain as much as possible of the discharged solution and add to the retained portion more aluminum salt so as to elevate the concentration to that required for coagulation. Where 50% reduction in concentration has occurred, it follows that the volume of the solution has been doubled and also that one half of the discharged solution can be returned to the manufacturing process for a boost in concentration. The remaining portion of the discharged solution cannot be utilized in the above method of recycling and must therefore be considered as plant waste. With this type of operation approximately 3.5 pounds of aluminum sulfate are required per 100 pounds of coagulated rubber in a standard Buna S synthetic rubber plant. The plant material cost therefore in respect to aluminum sulfate, priced roughly at $40 per ton, amounts in a year to $84,000, in a 60,000 ton per year synthetic rubber plant.

In addition to the loss of a valuable material needed in the manufacture of synthetic rubber, the portion of aluminum salt discharged to the sewer must eventually enter natural streams of water. If the effluent discharge is appreciable in comparison to the flow of the stream, the pH value of the water may be lowered to such an extent as to render the stream unfit for human consumption and recreational activities and for vegetable and animal life in and adjacent its course.

Also discharged in the effluent are rubber fines which are not retained by the coagulation equipment. If present in sufficient quantity, these fines discolor and generally affect the utility of the streams which receive them. Moreover, the rubber fines tend to sludge, coat, and clog any equipment through which they are discharged, creating thereby frequent interruptions of service and other maintenance problems. The retention of the fines is desirable not only to avoid these possible sources of difficulty but to reclaim a synthetic rubber product which is equal in quality to the more easily retained portions of the synthetic rubber coagula.

An object of this invention, therefore, is to reclaim the aluminum salts contained in liquid plant effluents such as occur in the manufacture of synthetic rubber, and return them in a concentrated condition and as a valuable raw material to the manufacturing process. It is an object also to purify such effluents to prevent contamination of streams into which they may flow. Further objects are to provide a continuous process and apparatus for treating the effluent and to reclaim the rubber fines which escape rubber coagulation and return them to the further processing of a marketable synthetic rubber. These and other objects will become apparent as the invention is described.

The invention is illustrated by the accompanying drawing, in which:

Fig. 1 is a diagrammatic elevation, partly in section of one form of apparatus of the invention;

Fig. 2 is a section taken on lines 2—2 of Fig. 1.

Fig. 3 is a diagrammatic elevation, partly in section of a modified form of apparatus of the invention; and Fig. 4 is a section taken on line 4—4 of Fig. 3.

Similar numerals refer to similar parts throughout the several views.

The objects of this invention are accomplished in three principal stages, i. e., (1) conversion with caustic of the soluble aluminum salts into an insoluble aluminum floc, essentially aluminum hydroxide, (2) separation of the aluminum floc and the accompanying synthetic rubber particles from the mother liquor, and (3) reconversion of the aluminum floc by sulfuric acid into soluble aluminum sulfate. At this stage the synthetic rubber fines may be removed as a flocculated material from the aluminum sulfate solution.

The first stage, as referred to above, is accomplished in the caustic sump 11 as illustrated in Figs. 1 and 3. Into this sump flows the dilute aluminum salt solution. An amount of caustic solution, just sufficient to cause complete conversion of the aluminum salt to aluminum hydroxide is admitted through an automatically controlled inlet 15, the automatic feature of which arises out of the maintenance of constant pH within the sump by a standard pH controller. The conversion is aided by vigorous agitation of the sump contents. The agitator 14 is of such a design that in addition to agitation considerable aeration is accomplished. Where greater aeration is required than the agitator-aerator can provide, an air distributing device such as a carborundum plate 36 in Fig. 3 may be utilized. The neutral aqueous dispersion containing aluminum hydroxide floc and a small amount of rubber fines which is produced herein, is discharged at a point near the bottom of the caustic sump into the evacuator.

The second stage, i. e., the separation of aluminum hydroxide and the rubber fines from the neutral clear liquor is accomplished in the evacuator 12. The rubber fines which normally float in water and are made buoyant by the aeration, collect at the surface of the liquid 17 and are raked into the collecting funnel 16. They are then washed through a pipe, opening into the acid sump and out of the evacuator with the aid of an overhead spray 38. The aluminum hydroxide floc is removed by a pipe which opens into the evacuator at the level of the aluminum hydroxide and discharges into the reaction chamber of the acid sump. The clear neutral solution now separated from the above solids passes under a solids-retaining baffle and through an overflow duct to a waste sump.

The third and final stage of the invention herein described is performed in the acid sump 13. Its function is primarily to convert the aluminum hydroxide floc to an aqueous solution of aluminum sulfate. As a secondary function the acid sump may provide storage for the aluminum sulfate solution. In the arrangement as shown in Figs. 1 and 3, the acid sump consists of the smaller reaction chamber 22, the contents of which overflow into the remaining portion of the acid sump designated herein as the aluminum sulfate storage 23. The conversion reaction takes place within the reaction chamber 22 and its rapidity is aided by the agitator 24. Concentrated sulfuric acid, the converting agent, flows through the pipe 25 by automatic pH control 26 into the reaction chamber 22. The rubber fines which accumulate at the surface of the liquid in the aluminum sulfate storage are removed manually at intervals of a day or so.

*The caustic sump*

The caustic sump is an open top tank preferably of concrete and situated as to elevation wholly below the bottom part and to one side of the evacuator 12. It is large enough to accommodate a back flow from the evacuator 12 (in case the vacuum in the evacuator should fail), equal to the volume of the feed pipe assembly 27, 29 and 30 (or 27, 28 and 30 in Fig. 3), from the caustic sump to the evacuator plus whatever volume may be contained in the evacuator above the level of the said inlet pipe 27 and below the regular operating liquid level of the evacuator.

The caustic sump 11 receives plant effluent containing aluminum salt from a pipe 31 suspended from above and extending slightly below the top of the sump 11. The concentrated caustic solution (50% NaOH is usual concentration) enters the caustic sump through a separate pipe 15 installed in a manner similar to the plane effluent pipe 31 just described. On the plant effluent pipe, a manually operated valve 32 is installed within easy reach of the top of the sump. On the concentrated caustic pipe 15 a controller operated valve 33 is placed within a foot or so of the end of the pipe protruding into the caustic sump. The controller operated valve is actuated by a standard pH control unit, the electrodes 34 of which extend into the sump just below the operating liquid level.

Suspended at the top of the caustic sump is a motor-driven agitator 35 mounted so that the blade extends on a vertical shaft well below the liquid surface level. The motor-agitator unit 35 is preferably of the type which includes as one example, the standard Dorr aerator. In the caustic sump as embodied in both Figs. 1 and 3, it is desired to produce aeration as well as agitation. Agitation is effective in producing rapid reaction between the aluminum salt and the caustic. The reaction must be rapid in order that the automatic pH control will operate accurately and not be subject to retarded opening and shutting of the caustic valve 33. Moreover, it is desired at this instant to whip into the liquid, the maximum amount of air that can be retained by the liquid, and the suspended solid particles.

In the process as illustrated in Fig. 1, wherein aluminum floc removal by settling is anticipated, only moderate aeration, sufficient to aid in the flocculating of the rubber particles and their removal at the liquid surface in the evacuator is contemplated, but which does not interfere with the tendency of the aluminum hydroxide particles to settle to the bottom of the evacuator. In Fig. 3, however, removal of the aluminum hydroxide is to be effected near the liquid surface but immediately under the synthetic rubber particle floc 17 which floats at top of the liquid in the evacuator. On account of slightly higher density of the aluminum hydroxide particle than the dispersing liquid, full exploitation of aeration must be obtained if these particles are to rise. The agitator-aerator 35 is adjusted to a depth conducive to highest aeration efficiency. Aeration is aided also by a horizontal porous carborundum plate 36 which is sealed around its periphery to the sides or bottom of the caustic sump. This plate 36 is located in the lower portion of the caustic sump in Fig. 3 just far enough from the bottom to permit the introduction of an air pipe 37 which enters the sump on the lower side of the said plate 36.

As the air or gas contained in the aerated liquid escapes rapidly at the liquid surface it is desired that the mixture of liquid and solid materials shall be transferred to the evacuator immediately after aeration so that full advantage may be obtained in the formation of the floc by the ascension of gas or air bubbles through the liquid containing the aluminum hydroxide and the rubber particles. To effect quick transfer of the liquid after aeration it is recommended that the size of the caustic sump does not substantially exceed that indicated by the considerations hereinbefore stated. If the size of the caustic sump, in order to accomplish proper aeration, should be reduced below the capacity which it should have, to prevent flooding arising from reverse flow from the evacuator, then an auxiliary sump adjacent thereto and connected by a weir should be constructed of sufficient capacity to receive the overflow from the caustic sump.

pH control

This invention is so embodied as to accommodate and process the continuous, erratic, or intermittent flow of the aluminum salt containing plant effluent. This flexibility of operation is obtained principally through the use of automatic pH control. Two points of accurate pH control are essential to this invention. They are the points at which the two principal chemical reactions occur, i. e., the caustic sump 11 and the acid sump 13. Standard pH control equipment of ordinary design is used at both sumps. The pH in the caustic sump 11 is controlled at approximately 7.0 so as to produce neutral effluent suitable for discharge from the evacuator to the sewer. In the acid sump efficient conversion of the aluminum hydroxide to aluminum sulfate is obtained if the pH is controlled at 2.5 to 3.0. The pH control is subject to what is called "lagging" unless certain precautions are taken. It may develop that pH control can be improved by using quicker acting valves, placing the valves at shorter distances from the points where the reactions are performed or by reducing the volume of the chamber in which the reaction occurs. The latter may be carried out by constructing a small chamber within the sump which contains the agitator or aerator and the pH control electrodes and which receives the reacting materials. This small chamber which may conveniently be of wood or concrete construction may then overflow into the sump proper.

The evacuator

The evacuator 12 is a standard air-tight unit similar in general outline to the Dorr classifier. It derives its name, however, from the vacuum producing feature which it embodies. Mounted on the exterior of the dome shaped roof is a motor driven air pump 40 which is connected with the interior of the evacuator by a pipe 41 projecting through the roof at any convenient point. This vacuum producing pump is equipped with suitable automatic control so that constant vacuum may be maintained at any desired level.

Projecting through the exact center of the roof of the evacuator to a point approximately at the liquid level of the evacuator is motor-driven vertical shaft 42 which supports the rotary rake or fines skimmer 43. The rotary rake consists of several horizontal steel members extending radially from the revolvable shaft 42 to the circular wall of the evacuator except for a small clearance to allow free rotation. These steel members 45 of this rotary rake 43 project sufficiently above and parallel to the liquid level to permit suspension therefrom by means of short perpendicular lengths of angle iron, sheet metal strips 46 which extend immediately below but parallel to the said radially extending steel members 45. The lower horizontal edges of these sheet metal strips 46 lie slightly under the surface of the liquid in the evacuator so that upon rotation of the rake assembly, solid floating material in the liquid is carried radially outwardly by centrifugal force as will be readily understood. A portion of the sheet metal strips 47, located at the outward end of each of the radially extending steel members 45 of the rotary rake 43, of sufficient length to extend across the rubber fines collecting funnel 16 in a radial direction, is hinged at its upper edge to the steel member 45. These sheet metal portions 47 are thereby able to swing in an arc backward and upward as they travel across the collecting funnel 16 and its attached approaching ramp 50.

Rubber fines, because of a specific gravity less than the liquid and also because of the action of the ascending air bubbles resulting from the aeration feature of this invention, collect at the surface of the liquid in the evacuator. The rubber fines after reaching the surface are impelled toward the circumferential wall by action of the rotary rake already described. At a position adjacent but radially inward from the wall, a funnel shaped collector 16 with the small end projecting downwards is placed so that the peripheral edge of the large end extends uniformly just above the liquid level from ½ to 2 inches. A ramp 50 of any appropriate material is extended at a small angle with horizontal in a circumferential direction opposite to rake rotation, from the topmost edge of the unsubmerged portion of the funnel-shaped collector 16. In order that the rubber particles may be transferred more readily downward through the collector and connecting drain pipe 18 leading to the acid sump, a water spray is directed into the funnel-shaped collector 16 from a nozzle 38 suspended immediately above the path of the rotating rake. The water is supplied from outside the evacuator through a pipe 51, the entrance of which through the evacuator wall is carefully sealed. A valve controlling the amount of spray is preferably installed in the water line outside of the evacuator. The drainpipe which conducts the rubber fines to the acid sump does not need a valve since the lower end of this pipe extends below the surface of the liquid level in the acid sump 13. An effective seal is formed since this liquid level is maintained at a depth lower than the operating liquid level of the caustic sump 11. The vacuum produced in the evacuator 12 preferentially draws into it the liquid of the caustic sump but allows simultaneously the free flow of liquid and fines out of the evacuator through the fines collector 16 and the attached drainage pipe 18.

A separate subsurface inlet, other than the rubber fines collector as in Fig. 3, is necessary for the removal of the aluminum hydroxide floc, so that hydrostatic pressure can be utilized to induce the flow of the floc through the discharge duct 55. When the floc is removed from the evacuator contents in the same manner as the rubber fines, considerable flush water is necessary to keep the discharge pipe 18 from being clogged. However, to obtain aluminum sulfate solution of high concentration from the acid sump, dilution of inflowing materials must be kept to a minimum. The subsurface duct 55 substantially reduces the need for wash water and thus it effectively contributes to the production of high concentration aluminum sulfate solution. Moreover, in periods of rapid floc formation, the aluminum hydroxide floc can be removed more rapidly than is possible with rotary rake 43 and collector assembly (50 and 16). Rubber fines, on the other hand are more readily collected by the rotary rake and collector assembly and require relatively small amounts of flush wash to carry them through the discharge pipe 18; in fact, no flush water is required when the rubber fines are carried out by the outmoving aluminum hydroxide slurry, where the aluminum hydroxide discharge duct and the rubber fines collector discharge pipe 18 are joined as in Fig. 3. As originally designed, the duct 55 through which the aluminum hydroxide was discharged to the reaction chamber of the acid sump, made a junction 56 within the evacuator with the rubber fines collector drainage pipe 18 which then served the dual purpose of conducting from the evacuator, both the rubber fines and the aluminum hydroxide. A butterfly valve 19 was installed in the aluminum hydroxide discharge pipe 55 before its junction 56 with the rubber fines collector drainage pipe 18 so that the discharge through the former might be manually controlled. An alternative arrangement is embodied in Fig. 1 by discharging the aluminum hydroxide through a separate outlet 21 through the wall into the reaction chamber 22. In this case the rubber fines collector drainage pipe 57 is constructed so as to avoid discharge into the reaction chamber but directly into the portion of the acid sump 23 designated as the aluminum sulfate solution storage. The arrangement of aluminum hydroxide and rubber fines discharge in Fig. 3 is applicable to the invention, regardless of whether flotation or settling is used to separate the aluminum hydroxide. The arrangement in Fig. 1 is restricted to the process when settling is used, because as the aluminum hydroxide is taken off the bottom there is no opportunity for the rotary rake to mix aluminum hydroxide with the rubber fines. When this mixing does occur as in the flotation method it is necessary to run the rubber fines through the reaction chamber of the acid sump.

The discharge of the caustic sump 11, which contains essentially aluminum hydroxide, rubber fines, and water is caused to flow into the evacuator 12 by a constant vacuum maintained therein. The size of the pipe (28 in Fig. 3 and 29 in Fig. 1) through which the above fluid and its suspended solids flow is greatly enlarged as it emerges vertically at the center of the bottom of the evacuator. Its diameter is determined by the volume to be handled; it must be such as to effect slow and uniform distribution of the influent on the evacuator interior without disturbing the settling and floatation characteristics of the evacuator contents. An inlet of suitable proportion and found satisfactory in the practice of this invention was a pipe, the diameter of which was 5% of the evacuator diameter, and its upper end ending in a flared funnel section of approximately twice the diameter of the pipe in height and three to four times the pipe diameter at the extreme upper edge.

In Fig. 1 where settling is employed to remove aluminum hydroxide, this evacuator inlet 27 just described extends only into the lower portion of the liquid so as to shorten the settling time. The rubber particles readily ascend to the liquid surface while the aluminum hydroxide particles settle at a much slower rate. However by shortening the distance of their descent the efficiency of the evacuator is considerably increased and the settlings can be removed in a thick slurry.

In Fig. 3 where flocculation of the aluminum hydroxide is employed and is collected just below the floating rubber fines, the inlet pipe assembly 28 and 27 may properly extend to within 12 to 18 inches of the liquid surface. It is desired in this variation of the invention to discharge influent from the caustic sump into the evacuator at an elevation approximately at or just below the separation plane of the aluminum hydroxide floc and the clear liquid, so that ascending aluminum hydroxide particles may be promptly received into the aluminum hydroxide floc before the liquid has given up a considerable portion of the air introduced therein by aeration.

The elevation of the clear effluent outlet coincides with the operating liquid level. Several designs are possible for the removal of the clear effluent from the evacuator. In the practice of this invention, the clear effluent outlet was surrounded by a liquid-tight baffle open at the bottom and top, with the lower end opening approximately midway into the clear effluent portion. In the settling process as illustrated by Fig. 1 the clear liquid lies below the floating rubber fines and above the settled aluminum hydroxide. Here the baffle 60 extends below the liquid surface approximately one fourth of the entire depth of the liquid; whereas, in the "floatation" or "flocculating" process as shown in Fig. 3, the rubber fines and flocculated aluminum hydroxide are in adjacent layers and the baffle 61 is extended further toward the bottom of the evacuator and in to the clear liquid. The clear liquid overflows through a pipe 63 closed to atmospheric pressure, to a sump 64 which acts as a trap and liquid seal. The level in this sump 64 is maintained at a level lower than that of the caustic sump by an overflow duct 66 to the plant sewer. Unusually clear effluent is obtained by this invention regardless of whether the aluminum hydroxide separation be by settling or flotation. It has been found that the aluminum hydroxide as it ascends or descends in the liquid of the evacuator, removes the colloidal particles of rubber.

*The acid sump*

The acid sump 13 embodies two principal elements, the reaction chamber 22 and the aluminum sulfate solution storage 23. The former is a small enclosure within the acid sump just large enough to provide ample space for the agitator 24, the acid feed pipe 25, the aluminum hydroxide-rubber fines pipe (18 in Fig. 3 or 21 in Fig. 1) and the automatic pH control electrodes 26. It is purposely small so as to provide quick response of the acid feed control to change in pH. The remaining space in the acid sump receives the overflow from the reaction chamber 22 and thus becomes the aluminum sulfate solution storage 23 the liquid level of which can be allowed to fluctuate. In the reaction chamber 22, the regeneration of the aluminum salt is effected by mixing concentrated sulfuric acid with the aluminum hydroxide from the evacuator. The flow of sulfuric acid is automatically regulated by the pH control device already referred to. Although, in accordance with the drawings the flow of aluminum hydroxide into the reaction chamber is manually controlled, automatic control actuated by such mechanisms as floats or other devices utilizing differences in densities may be substituted and considered within the scope of this invention.

Since the utility of this invention arises principally out of its capacity to produce an aluminum sulfate solution of sufficient concentration to replace that which is used in the manufacturing process from which the waste low-concentration aluminum salt solution is discharged, it is desirable to receive as little liquid into the acid sump as possible. Therefore, concentrated sulfuric acid is used and the aluminum hydroxide slurry is received from the evacuator with as little accompanying liquid as is practicable in the operation of the evacuator. Also, a minimum amount of spray water is used to wash the synthetic rubber fines through the collector in the evacuator. In the process as illustrated by Fig. 1 where settling of the aluminum hydroxide is utilized and there is little danger of removing the same by its intermixing with the floating rubber floc, a separate drain pipe independent of the aluminum hydroxide slurry outlet leading to the aluminum sulfate storage 23 or to a separate sump is practicable. If a separate sump, independent of the acid sump 13, is used to receive the rubber fines and the accompanying wash water, rubber particles may then be removed from the sump and the water discharged to the plant sewer. Another alternative is to remove the baffle surrounding the clear effluent outlet in the evacuator and allow the rubber particles to discharge through this outlet and to collect in the separate sump 64 provided for the clear effluent. These expedients may be used where high concentration of the product is required, and alternatives to the arrangement such as shown in Fig. 1 are desired. Where flotation of the aluminum hydroxide is employed, as in Fig. 3, the synthetic rubber fines are mixed with considerable aluminum hydroxide as they are collected by the fines skimmer 43 and the collector assembly 16. The fines must therefore be discharged into the reaction chamber 22 so that the included aluminum hydroxide can be reclaimed.

It is expected that a variance in local conditions will emphasize some of the advantages herein claimed for this invention and tend to nullify others. Under ordinary market conditions the value of the aluminum sulfate reclaimed will far exceed the value of the caustic and sulfuric acid used in its reclamation. However, unskilled operation, or inappropriate size of the evacuator may result in considerable aluminum hydroxide being carried by the clear effluent discharge system to the waste sewer and thus destroy wholly or partially the prospective gain on material cost.

Greatest economy in this method of aluminum salt reclamation is derived by concentrating only a portion of the dilute aluminum salt effluent from the synthetic rubber coagulation equipment. The concentrated portion derived from the equipment embodied in this invention is then mixed with the unconcentrated portion which does not pass through the said equipment, in such a ratio as to yield a coagulating solution of the proper concentration. It will be seen, also, that economy is increased as the concentration of the aluminum sulfate solution taken from the acid sump is increased. Increases in concentration of the solution through efficient operation of this invention are repaid by disproportionately greater increases of concentrating power when mixed with dilute solutions to obtain solutions of intermediate concentrations.

In localities where stream pollution is restricted, the nature of the discharged effluent becomes the controlling reason for invoking the practice of this invention. In addition to producing a neutral effluent suitable for discharge into the streams, said effluent is remarkably free of suspended particles of all types and sizes, thus protecting the appearance, as well as the utility of the water in the streams into which the effluent is released.

The materials of construction and apparatus herein described may be varied without departing from the spirit and scope of the invention defined by the following claims.

What is claimed is:
1. A process of treating a synthetic rubber coagulant effluent containing an aqueous solution of an aluminum salt and suspended particles of synthetic rubber, including adding caustic to the effluent to precipitate the aluminum as aluminum hydroxide, aerating the resulting liquid mixture whereby the rubber particles rise to the surface of the aerated mixture and the aluminum hydroxide concentrates in a layer therebeneath leaving the bulk of the liquid mixture as a clear neutral aqueous solution, conducting the clear solution away from the mixture as discharge liquor, removing the layer of aluminum hydroxide concentrate and the rubber particles from the mixture, and treating the aluminum hydroxide concentrate with an acid to convert it to a relatively concentrated aqueous solution of an aluminum salt.

2. A process of treating a synthetic rubber coagulant effluent containing an aqueous solution of an aluminum salt and suspended particles of synthetic rubber, including adding caustic to the effluent to precipitate the aluminum as aluminum hydroxide, aerating the resulting liquid mixture whereby the rubber particles rise to the surface of the aerated mixture and the aluminum hydroxide concentrates in a layer near the surface of the liquid adjacent to and intermixed with the rubber particles leaving the bulk of the liquid as a clear neutral aqueous solution, conducting the clear solution away from the mixture as discharge liquor, removing the layer of aluminum hydroxide concentrate and rubber particles from the mixture, and treating the aluminum hydroxide concentrate with an acid to convert it to a relatively concentrated aqueous solution of an aluminum salt.

3. A process of treating a synthetic rubber coagulant effluent containing an aqueous solution of an aluminum salt and suspended particles of synthetic rubber, including adding caustic to the effluent to precipitate the aluminum as aluminum hydroxide, aerating the resulting mixture whereby the rubber particles rise to the surface of the aerated mixture and the aluminum hydroxide settles and concentrates in a layer at the bottom of the liquid mixture leaving the bulk of the liquid mixture as a clear neutral aqueous solution, conducting the clear solution away from the mixture as discharge liquor, removing the layer of aluminum hydroxide concentrate and the rubber particles from the mixture, and treating the aluminum hydroxide concentrate with an acid to convert it to a relatively concentrated aqueous solution of an aluminum salt.

ALVIN D. MILLER.
ROBERT F. O'CONNELL.

REFERENCES CITED

The following references are of record in the file of this patent:

UNITED STATES PATENTS

| Number | Name | Date |
| --- | --- | --- |
| 78,005 | Pemberton | May 19, 1868 |
| 1,227,198 | Reuter | May 22, 1917 |
| 2,250,926 | Clark | July 29, 1941 |
| 2,361,283 | Good | Oct. 24, 1944 |
| 2,408,128 | Squires et al. | Sept. 24, 1946 |
| 2,419,512 | Vesce | Apr. 22, 1947 |